US007014679B2

(12) United States Patent
Parekh et al.

(10) Patent No.: US 7,014,679 B2
(45) Date of Patent: Mar. 21, 2006

(54) PROCESS FOR DEGASSING AN AQUEOUS PLATING SOLUTION

(75) Inventors: Bipin Parekh, Chelmsford, MA (US); Saksatha Ly, Lexington, MA (US); Qunwei Wu, Westford, MA (US)

(73) Assignee: Mykrolis Corporation, Billerica, MA (US)

( * ) Notice: Subject to any disclaimer, the term of this patent is extended or adjusted under 35 U.S.C. 154(b) by 0 days.

(21) Appl. No.: 10/467,245

(22) PCT Filed: Jan. 31, 2002

(86) PCT No.: PCT/US02/02924

§ 371 (c)(1), (2), (4) Date: Aug. 6, 2003

(87) PCT Pub. No.: WO02/062446

PCT Pub. Date: Aug. 15, 2002

(65) Prior Publication Data

US 2004/0060436 A1 Apr. 1, 2004

Related U.S. Application Data

(60) Provisional application No. 60/267,295, filed on Feb. 7, 2001.

(51) Int. Cl.
*B01D 19/00* (2006.01)
*B01D 53/22* (2006.01)

(52) U.S. Cl. ........................... 95/46; 96/6; 96/8; 96/10; 205/291; 205/349

(58) Field of Classification Search .................... 95/46, 95/54; 96/6, 8–10, 14; 205/291, 349, 296–298
See application file for complete search history.

(56) References Cited

U.S. PATENT DOCUMENTS

| | | | | |
|---|---|---|---|---|
| 4,869,732 | A | 9/1989 | Kalfoglou | |
| 5,266,639 | A * | 11/1993 | Chapman, Jr. et al. | 525/200 |
| 5,383,483 | A | 1/1995 | Shibano | |
| 5,584,914 | A | 12/1996 | Senoo et al. | |
| 5,695,545 | A | 12/1997 | Cho et al. | |
| 5,762,684 | A | 6/1998 | Hayashi et al. | |
| 5,788,742 | A | 8/1998 | Sugimoto et al. | |
| 5,830,261 | A * | 11/1998 | Hamasaki et al. | 96/6 |
| 6,171,367 | B1 | 1/2001 | Peng et al. | |
| 6,217,634 | B1 | 4/2001 | Dominelli et al. | |
| 6,328,785 | B1 * | 12/2001 | Hayashi | 95/46 |
| 6,461,407 | B1 * | 10/2002 | Takamatsu et al. | 95/46 |
| 2004/0026255 | A1 * | 2/2004 | Kovarsky et al. | 205/99 |

FOREIGN PATENT DOCUMENTS

| | | |
|---|---|---|
| DE | 3822093 | 1/1989 |
| WO | WO 02/062446 | 8/2002 |

* cited by examiner

*Primary Examiner*—Robert H. Spitzer
(74) *Attorney, Agent, or Firm*—Timothy J. King; John E. Pillion

(57) ABSTRACT

A process for removing oxygen from a copper plating solution is provided. The solution is passed through a degasser comprising a shell and hollow hydrophobic fiber porous membranes wherein the shell while a vacuum is drawn on the surfaces of the fibers opposite the fiber surfaces contacted by the solution. Gas passed through the fiber walls while liquid is prevented from infiltrating the fiber pores. The composition of the solution is monitored so that the composition can be retained substantially constant by adding components of the solution as needed.

8 Claims, 7 Drawing Sheets

PROCESS FOR DEGASSING AN AQUEOUS PLATING SOLUTION

This application claims the benefit of Provisional Application No. 60/267,295, filed Feb. 7, 2001.

FIELD OF THE INVENTION

This invention relates to a process for removing all dissolved gasses from aqueous electroplating and electroless plating bath solutions. More particularly, this invention relates to a process for removing dissolved gasses including oxygen from aqueous copper plating and electroless plating bath solutions.

BACKGROUND OF THE INVETION

Recently copper electrochemical deposition processes have become available to form electrically conductive pathways on semiconductor chips. Copper electrochemical deposition process for the damascene structures of high aspect ratios for semiconductor manufacturing is a new application of the conventional electroplating process. The electroplating of high aspect ratio devices involves the use of copper plating to fill high aspect ratio sub-micron trenches and vias positioned on semiconductor chips. An acidic copper sulfate solution of optimized composition has proven to be the best formula for plating micro-features. Typically, the process consists of circulating a plating solution from a reservoir to a plating cell and back to the reservoir. A copper anode in the plating cell provides the source of copper, which is deposited on the cathode comprising a silicon wafer with the damascene structure.

The final performance of the plated wafer depends on the electrical and morphological properties of the deposited copper film. The electrochemical bath composition plays a significant role in deposited copper film properties. The solution concentration of copper and sulfate ions, chloride ions, metallic impurities, and organic additives all are important parameters for providing acceptable copper deposition.

The organic additives added to the bath include accelerators, brighteners, suppressors, and levelers. The combination of these additives determines fling properties as well as the film's initial grain size, brightness or roughness. The optimum bath composition is maintained by periodic analysis and replenishing of the plating bath.

During operation of the bath, the solution is constantly exposed to environmental oxygen as the surrounding air is entrained into the recirculating plating solution. It has been determined that some of the organic additives are sensitive to oxidative decomposition. Accelerated organic additive consumption changes the chemical composition of the bath which, in turn, can adversely affect the acceptability of the deposited copper film. The bath chemical composition can be changed both by the depletion of one or more organic additives and by the increased concentration of organic decomposition produced.

The presence of dissolved gas such as oxygen in the plating bath also can cause the formation of undesirable microvoids in the plated copper film This, in turn, can cause reduced electrical conductivity in the copper pathways formed in the semiconductor surface.

Accordingly, it would be desirable to provide a copper electrochemical deposition process wherein decomposition of organic additives in a copper plating bath is controlled and minimized. In addition, it would be desirable to provide such a process wherein dissolved gas in a copper plating bath is removed.

SUMMARY OF THE INVENTION

The present invention is based upon the discovery that oxygen can be removed from an aqueous copper plating bath containing organic additives to stabilize the bath against decomposition of the organic additives by passing the bath through a degasser apparatus comprising a shell (housing) having hydrophobic hollow porous membranes (fibers) which extend through the shell. The hollow hydrophobic porous membrane permits passage of gas therethrough while preventing passage of liquid therethrough. The plating bath solution can be passed either through the shell to contact the outer surfaces of the hollow hydrophobic porous membrane or through the lumens of a hydrophobic hollow porous membranes under conditions that prevent significant intrusion of the bath solution into the membrane pores while permitting passage of oxygen gas through the pores. The degasser wherein the bath solution is introduced into the shell to contact the outer surfaces of the hollow membrane is referred to in the art as a "shell side degasser".

In accordance with this invention, a copper anode and a cathode comprising a substrate such as a silicon wafer, upon which an electrically conductive copper pathway is to be plated, are immersed in an acidic aqueous copper plating bath in a plating step. The plating bath contains organic additives which facilitate plating of copper including accelerators, brighteners, suppressors and levelers. Aqueous copper plating solution is directed to the plating step by being passed through a filter to remove particles therein and then through the hollow fiber membrane degasser to remove dissolyed oxygen from the solution. Degassing is effected with the hollow fiber membranes under conditions that intrusion of liquid through the pores of the membranes is prevented. The plating solution is removed from the plating bath and is directed to a reservoir for the solution where its composition can be monitored to determine whether additional organic additive or acid should be added thereto in order to maintain the desired composition which is efficient for attaining satisfactory copper plating in the plating step.

DESCRIPTION OF SPECIFIC EMBODIMENTS

Figure 1:
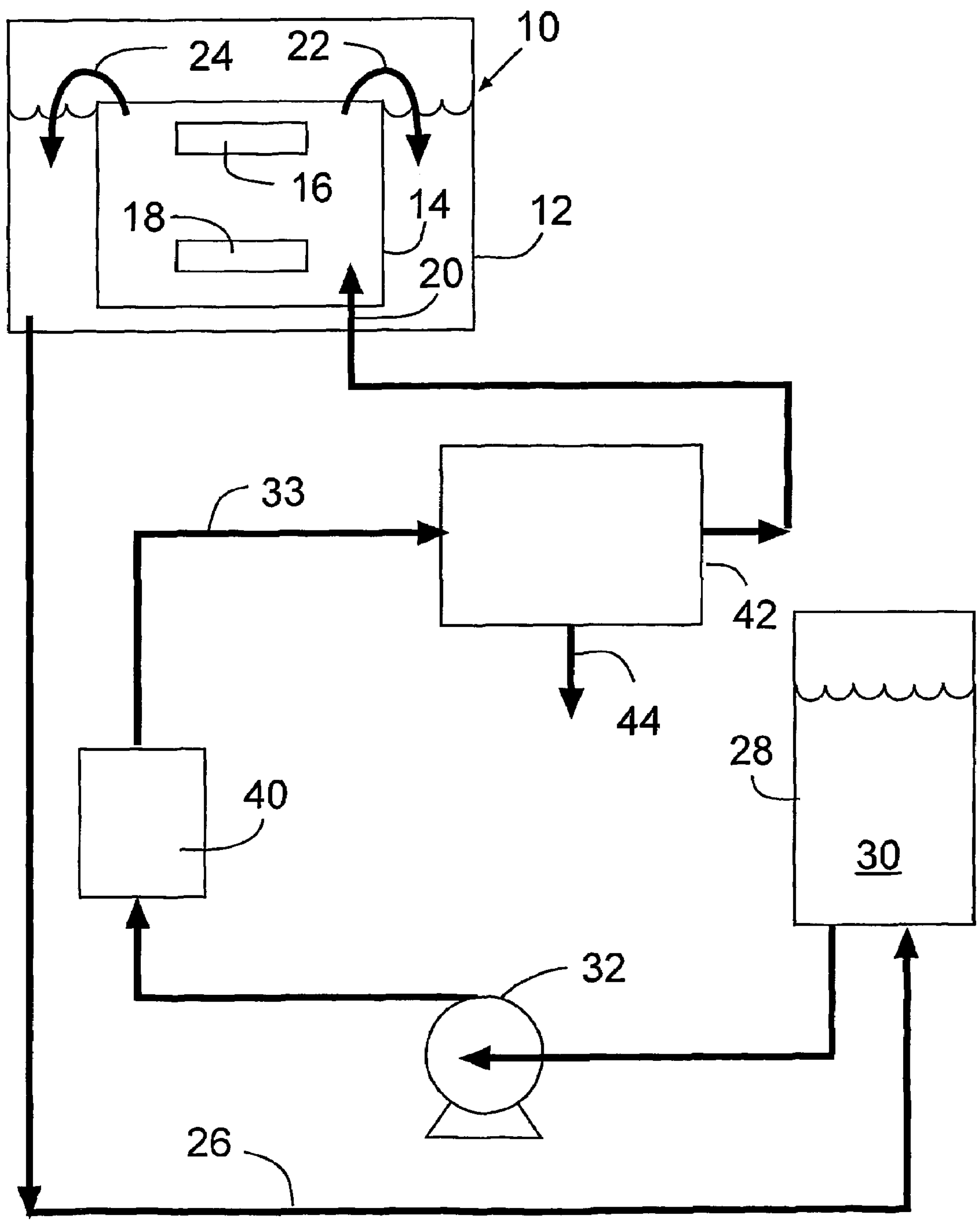
FIG. 1 is a schematic flow sheet illustrating the process of this invention.

Degassing of an aqueous acidic copper plating solution to remove oxygen is effected by passing the solution through a degasser comprising a shell through which extend hydrophobic hollow porous membranes. The plating solution can be passed through the shell to contact the outer surfaces of the hollow porous fiber membranes or through the lumens of the hollow porous fiber membranes. The solution is passed through the degasser under conditions to prevent liquid flow through the pores of the membranes while permitting gas flow through the membrane pores. Thus, the membrane surfaces are not wet by the solution thereby preventing significant liquid intrusion into the membrane pores. While the solution is passed either through the shell or through the hollow porous fiber membranes, a subatmospheric pressure is effected on the surfaces of the membranes opposite the membrane surfaces contacted by the bath by removing gas either from the lumens of the membrane or from the housing.

The hollow porous fiber membranes are formed from a hydrophobic polymer having a surface energy equal to or greater than about 23 dynes/cm, preferably greater than about 25 dynes/cm. Representative suitable hydrophobic polymers include skinned hydrophobic polymers such as perfluoroalkoxy polymers (PFA) such as perfluoro (alkoxy vinylether), fluorinated ethylene-propylene polymer (Teflon FEP) or the like. The membranes typically have a bubble point greater than about 100 psi. Suitable skinned membranes can be produced by the process of U.S. patent application No. 60/117,854, filed Jan. 29, 1999 which is incorporated herein by reference.

The vacuum utilized to effect degassing to remove oxygen from the solution positioned either within the shell or within the lumens of the hollow porous fiber membranes is between about 10 inch Hg and about 29 inch Hg, preferably between about 25 inch Hg and about 28 inch Hg.

Typically, the fibers range in length between about 8 inches and about 20 inches although fibers of shorter or longer length can be employed. Typical conditions of flow of the aqueous solution through the shell or through the fibers are between about 10 and about 30 liters/minute. Under these process conditions, oxygen concentration in the solution is reduced to below about 6 ppm, preferably below about 3 ppm.

The degassing apparatus of the invention generally is made by potting the hollow fiber porous membrane to both ends of a shell (housing) so that liquid flow through the degasser is effected through the lumens of the hollow fibers or through the portion of the shell interior not occupied by the hollow fibers. Potting is a process of forming a tube sheet having liquid tight seals around each fiber. The tube sheet or pot separates the interior of the final contactor from the environment. The pot is thermally bonded to the housing vessel to produce a unitary end structure. The unitary end structure comprises the portion of the fiber bundle which is encompassed in a potted end, the pot and the end portion of the hydrophobic thermoplastic housing, the inner surface of which is congruent with the pot and bonded to it. By forming a unitary structure, a more robust degasser is produced. That is, it is less likely to leak or otherwise fail at the interface of the pot and the housing. A suitable potting and bonding process is described in U.S. patent application No. 60/117,853 filed Jan. 29, 1999, the disclosure of which is incorporated by reference.

Potting and bonding are done in a single step. An external heating block is used for potting one end at a time. The perfluorinated thermoplastic end seals are preferably made of poly (tetrafluoroethylene-co-perfluoro (alkylvinylether)) having a melting point of from about 250° C. to about 260° C. A preferred potting material is Hyflon® 940 AX resin, from Ausimont USA Inc. Thorofire, N.J. Low viscosity poly (tetrafluoroethylene-cohexafluoropropylene) with low end-of-melt temperatures as described in U.S. Pat. No. 5,266,639 is also suitable. The process involves heating the potting material in a heating cup at around 275° C. until the melt turns clear and is free of trapped bubbles. A recess is made in the molten pool of potting material that remains as a recess for a time sufficient to position and fix the fiber bundle and housing in place. Subsequently, the recess will fill with the molten thermoplastic in a gravity driven flow.

A unitary end structure, by which is meant that the fibers and the pot are bonded to the housing to form a single entity consisting, for example, of perfluorinated thermoplastic materials is prepared by first pretreating the surfaces of both ends of the housing before the potting and bonding step. This is accomplished by melt-bonding the potting material to the housing. The internal surfaces on both ends of the housing are heated close to its melting point or just at the melting point and immediately immersed into a cup containing powdered (poly (PTFE-CO-PFVAE)) potting resin. Since the surface temperature of the housing is higher than the melting point of the potting resins, the potting resin is then fused to the housing resin—a condition for bonding to occur. The housing is then taken out and polished with a heat gun to fuse any excess unmelted powder. Without this pretreatment step, the housing surfaces often detach from the potting surfaces because of absence of intermixing of the two resins.

The unitary end structure(s) is cut and the lumen of the fibers exposed. The potted surfaces are then polished further using a heat gun to melt away any smeared or rough potted surfaces. A solder gun can be used to locally remelt and repair any defective spot, sometimes with the help of a drop of melted resin.

The process of this invention is illustrated in FIG. 1. As shown in FIG. 1, a plating bath 10 is provided which includes a housing 12, an inner tube 14 which includes a copper anode 16 and a cathode substrate to be plated such as a silicon wafer 18. The surface of the solution in housing 12 can be blanketed with nitrogen or an inert gas such as argon, helium or the like to reduce oxygen dissolved in the solution. Degassed aqueous acidic copper solution containing organic additives is directed through conduit 20 into inner tank 14 wherein a voltage is established between anode 16 and cathode 18. Spent solution is removed from tank 14 as indicated by arrows 22 and 24 through conduit 26 and is directed to reservoir 28. At reservoir 28, the spent solution 30 can be analyzed for organic concentration and concentration of additive decomposition product. Based on the analyses, organic additives can optionally be added to solution 30. The solution 30 then is pumped by pump 32 through particle filter 40, conduit 33 and then through degasser 42 containing the hollow porous fiber membranes in a housing as described above and wherein a vacuum is drawn through conduit 44. The degassed solution with reduced oxygen concentration is returned to tank 12 through conduit 20. It is to be understood that a plurality of degassing units 42 can be utilized either in parallel or in series to reduce oxygen content of the solution being cycled through the process of this invention.

The following examples illustrate the present invention.

Two types of experiments were performed: [1] without degasser and [2] with degasser in the plating bath system to determine if the additive consumption can be controlled/reduced.

EXAMPLE 1

Experiments Without Degasser

Experiments were performed in a copper electroplating tool. The plating solution from a reservoir (~75 liters) is circulated (~17 liters/min flow rate) through a plating cell containing a silicon wafer cathode and a copper anode. The solution additives are maintained at adequate level by periodically analyzing the bath for composition and adding the make up amount.

Figure 2:
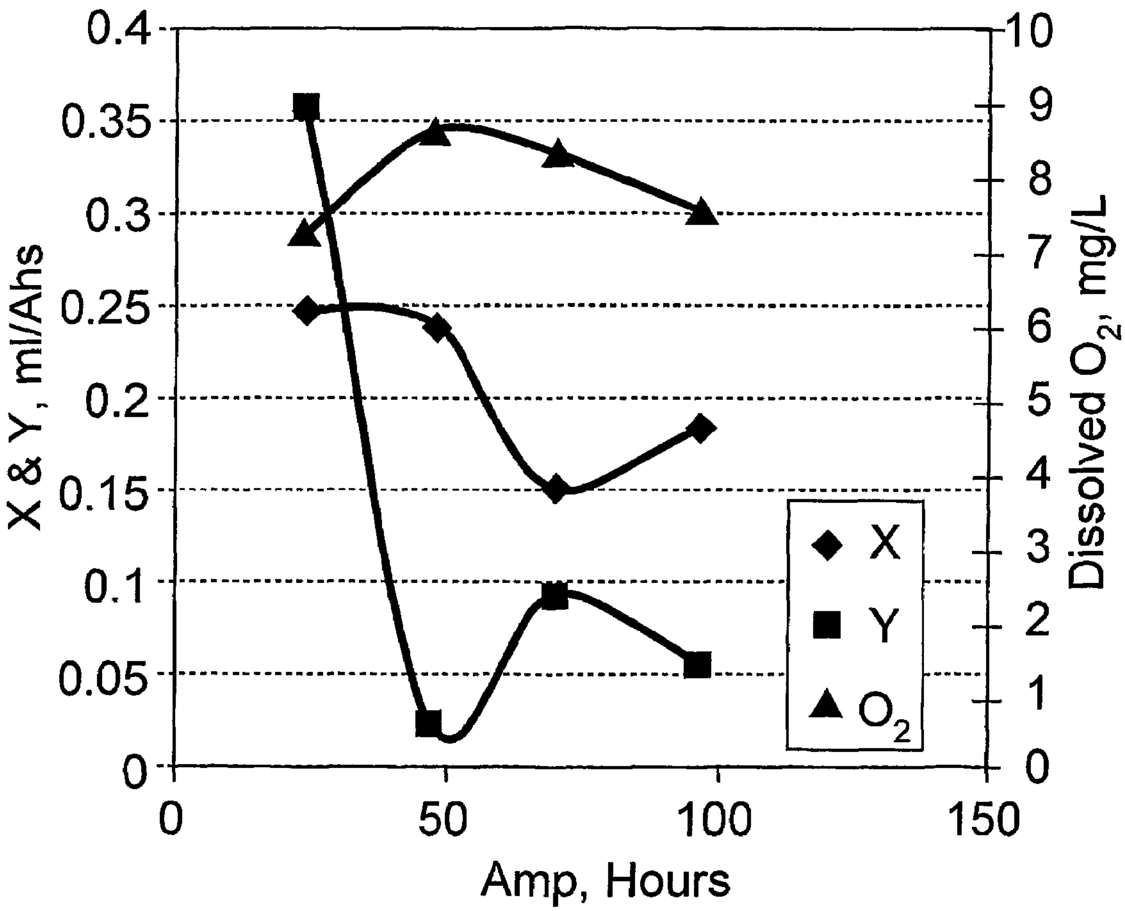
FIG. 2 is a graph showing consumption of organic additives in a copper plating bath without removing oxygen in Example 1.

An analysis of two key additive components and dissolved oxygen in the solution, for one week, is profiled in FIG. 2 wherein X and Y are two different organic additives. FIG. 2 plots Amp. Hours vs. additive concentration or oxygen concentration. As shown in FIG. 2, the X and Y additives were consumed in the presence of oxygen.

EXAMPLE 2

Use of Single Degasser

A second set of experiments were conducted as described in Example 1 but with a degasser unit turned on (~26 Hg vacuum). The degasser unit included 10 inch hollow fiber skinned PFA ultrafiltration membranes. The dissolved oxygen and additive concentration in the bath were monitored as profiled in FIG. 3.

Figure 3:
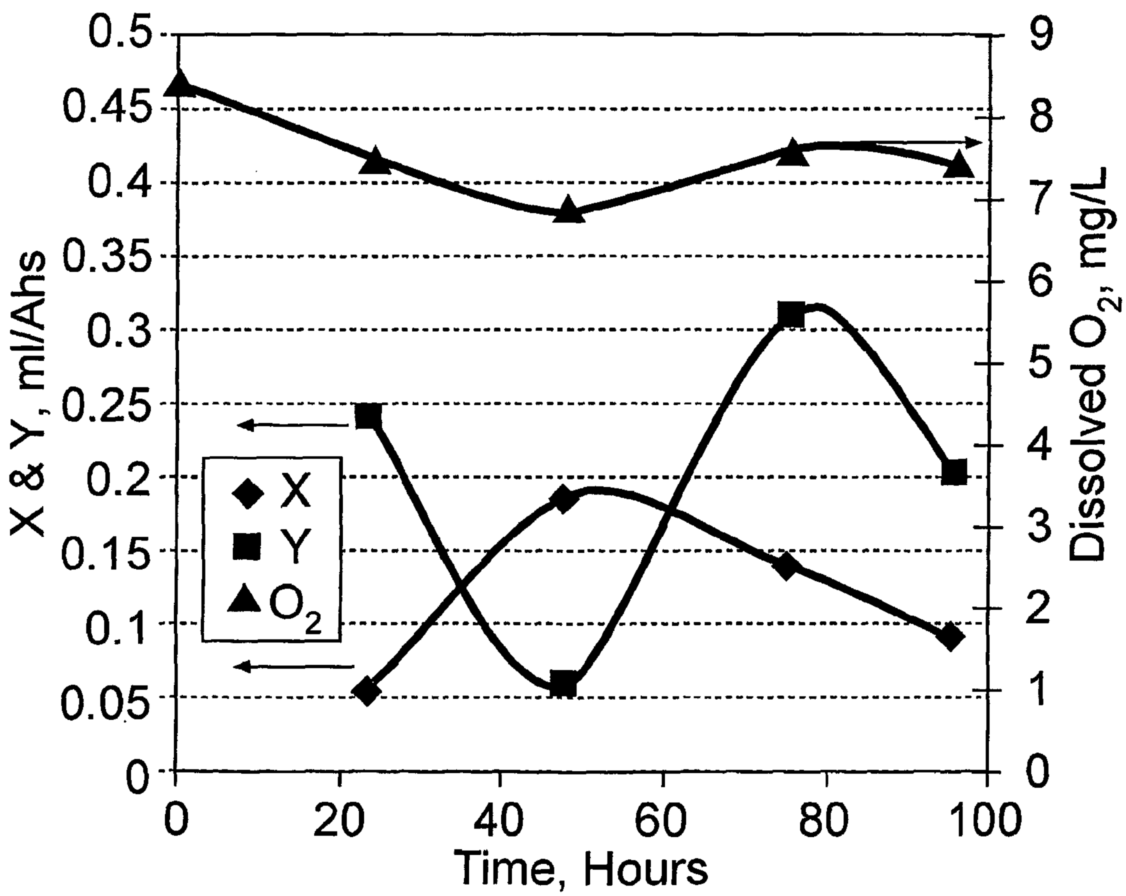
FIG. 3 is a graph showing consumption of two organic additives with oxygen removal in Example 1.
Figure 4:
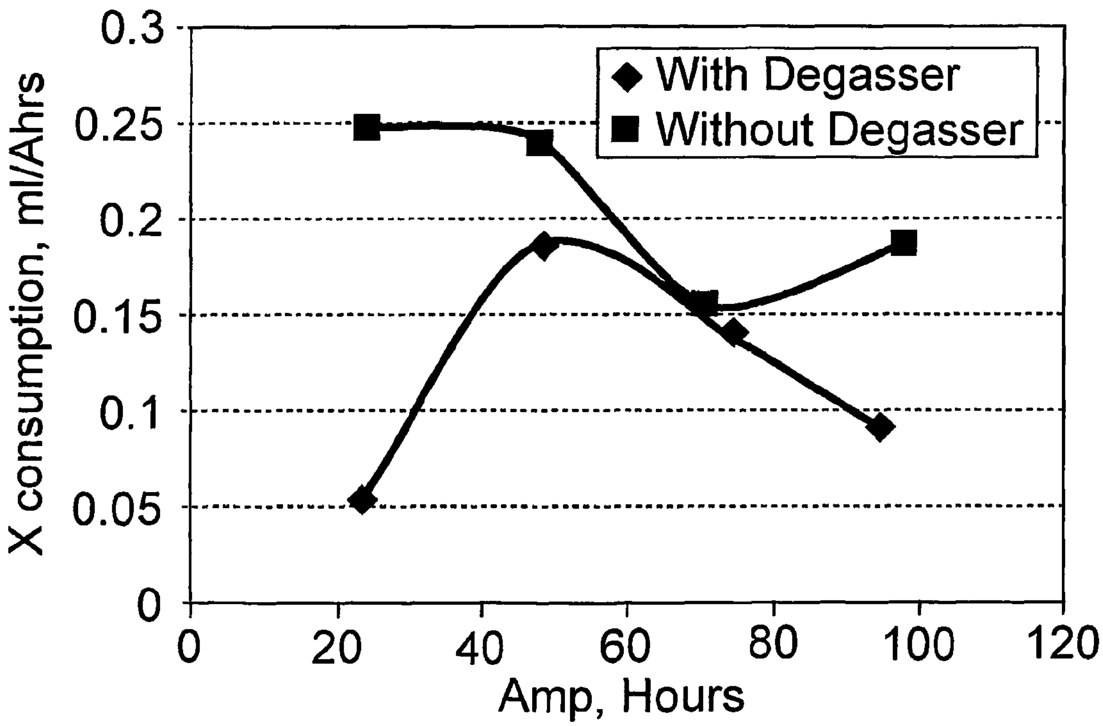
FIG. 4 is a graph showing consumption of an organic additive with and without oxygen removal in Example 1.

As shown in FIG. 3, the process with a degasser lowers the dissolved oxygen in the solution by about 1 ppm. The concentration of component X in the additive is less affected (consumed) with the degasser or without the degasser. These results are shown in FIG. 4. The data show that with the degasser on, the consumption of the additive component X was less.

EXAMPLE 3

Three Degassers and Nitrogen Blanket

Three degasser modules of the type used in Example 2 were installed (in a parallel configuration) in the copper plating unit. The objective was to determine incremental improvements in degassing efficiency and its effect on the additive consumption, over time.

The system performance was also improved by reducing/eliminating the sources of oxygen entrainment into the plating solution at the cell overflow, drain pipe return line, and the solution reservoir by infusing nitrogen and covering these areas with appropriate plastic lids or plastic sheeting.

Figure 5:
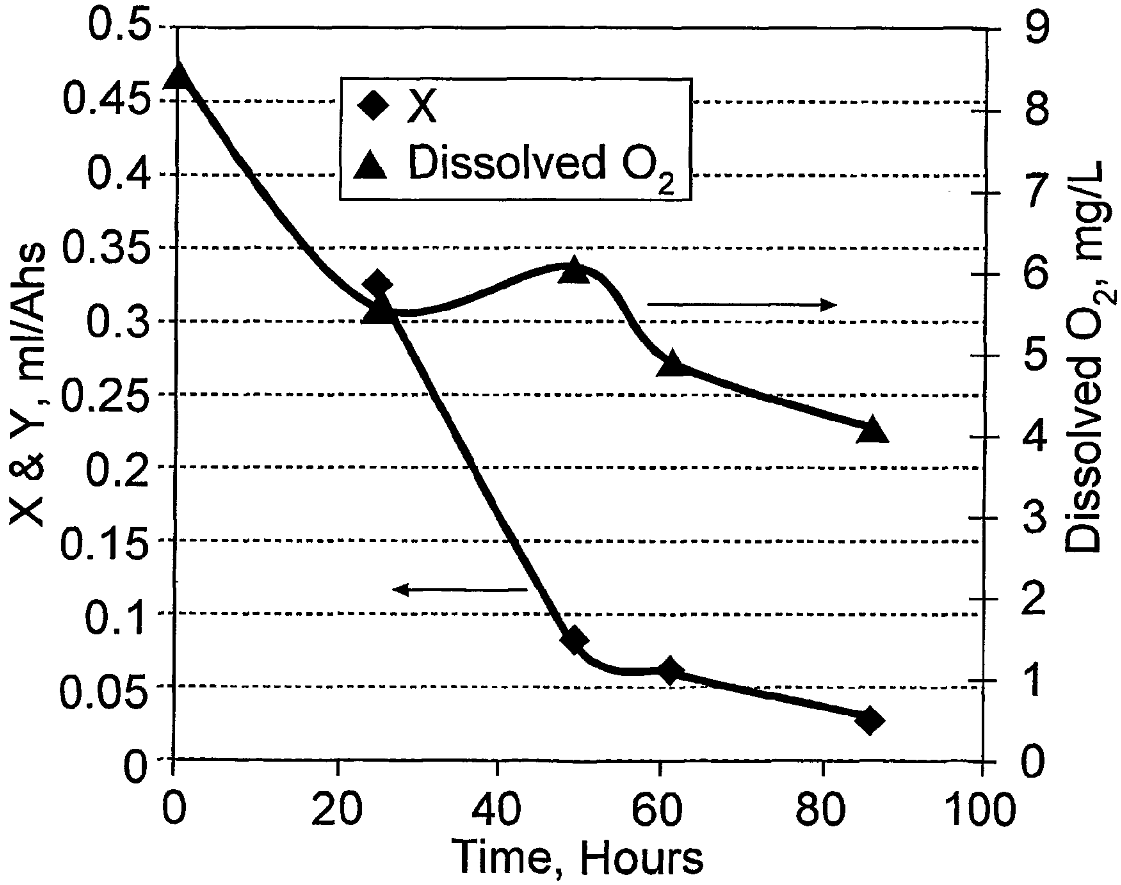
FIG. 5 is a graph showing consumption of an oxygen additive utilizing the degassing steps in parallel in Example 1.

Preliminary results indicate the degassing efficiency increased to about 40% with three degasser (vs 10–15% with one degasser). Upon adding/covering various exposed areas with a nitrogen blanket, there was a significant improvement in the degassing efficiency in ~50%. The bath samples were analyzed for additive consumption. The results show a dramatic decline in the additive consumption under the high degassing condition (dissolved oxygen in 4–5 ppm range) (See FIG. 5).

It is seen from the tests that a reduction in dissolved oxygen using the degasser, inline has the benefit of lowering the consumption of some additives in a copper electroplating bath

EXAMPLE 4

This example illustrates the process of this invention utilizing a shell side degasser wherein a plating solution contacts the outer surfaces of hollow hydrophobic fiber membranes positioned within a shell.

A Liqui-cell degasser available from Celgard, Inc., Charlotte, N.C., U.S.A., (liquid flow on the outside of hollow fiber, vacuum on the lumen side) was installed and operated for about 10 days. The integrity of the degasser was very good. There was no sign of weeping or leaking. The single pass efficiency was 37+/−8% at 4.5 GPM solution flow rate. The total system efficiency was about 73+/−5%, which was calculated based on the saturated $O_2$ level in the bath. The analysis of additives showed that the degasser reduced the consumption rate of Additive X. (A) The integrity is determined in two ways. [1] Before the installation, the degasser is subjected to a 60 psi water pressure on the shell side. Any structural defects would manifest by leaks at the potting ends. An absence of any such leaks would indicate the degasser is integral. [2] After the installation, the test involves a visual observation for the presence of any plating solution on the gas side. (B) Total system efficiency. The system efficiency for oxygen removal is the ratio of the dissolved oxygen concentration in the bath at any time to the initial oxygen level at the start of the run.

$$\%\text{ system efficiency} = \frac{\text{bath oxygen concentration at time } t \text{ (ppm)}}{\text{initial bath oxygen concentration (ppm)}}$$

Experimental

The experiments were performed in a re-circulated copper plating tool under the following operating conditions:

- A used Gen6B2 Anode package with about 8,000 ŭm plated
- Anode flow rate: 340 ml/min without the anode downstream filter
- 40 ma/cm$^2$ current density with rotating cathode at 20 rpm.
- Flow rate=4.5+/−0.3 GPM, Temperature=15+/−2.0° C., Additive X=5.0+/−1.0 ml/L, Y=14+/−2.0 ml/L, Cl=60+/−10 ppm and $H_2SO_4$=20+/−10 g/l
- 24 hours operation without interruptions

Results

Degasser Efficiency

Figure 6:
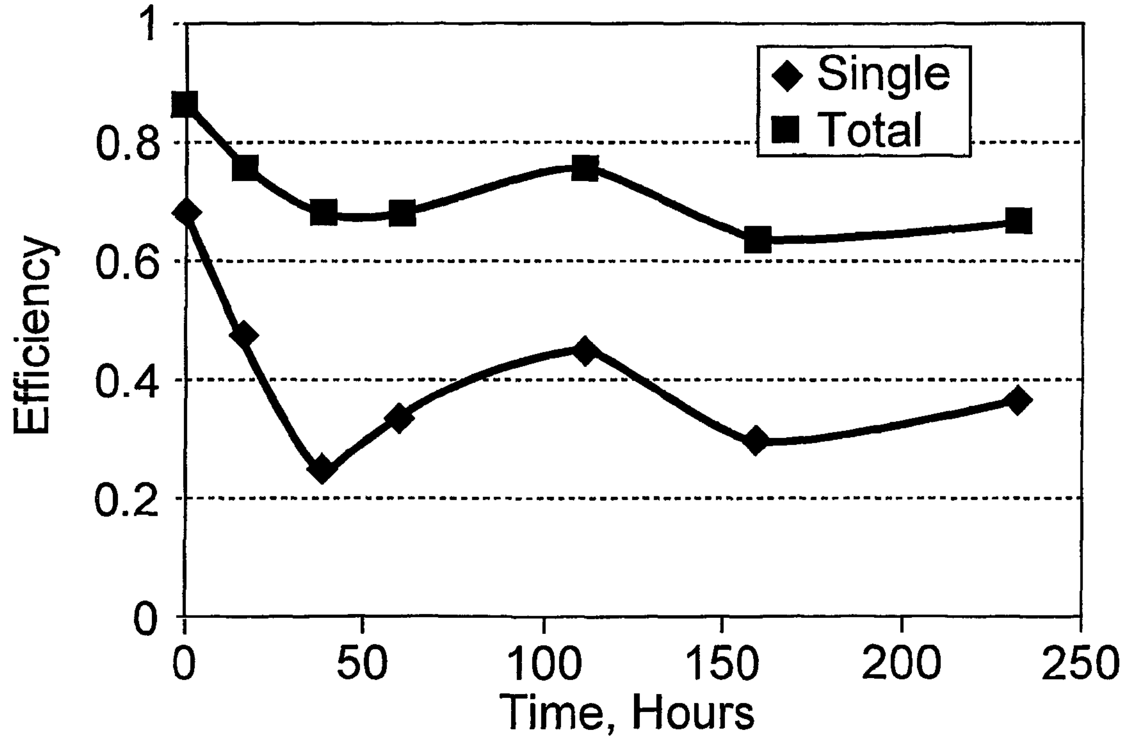
FIG. 6 is a graph of efficiency in removing gas in the degasser of Example 4.

As shown in FIG. 6, the degasser single pass efficiency was 37+/−8% throughout the testing period. The total system efficiency was about 73+/−5%, which was calculated based on the saturated $O_2$ level in the bath.

Additive Consumption Results

Figure 7:
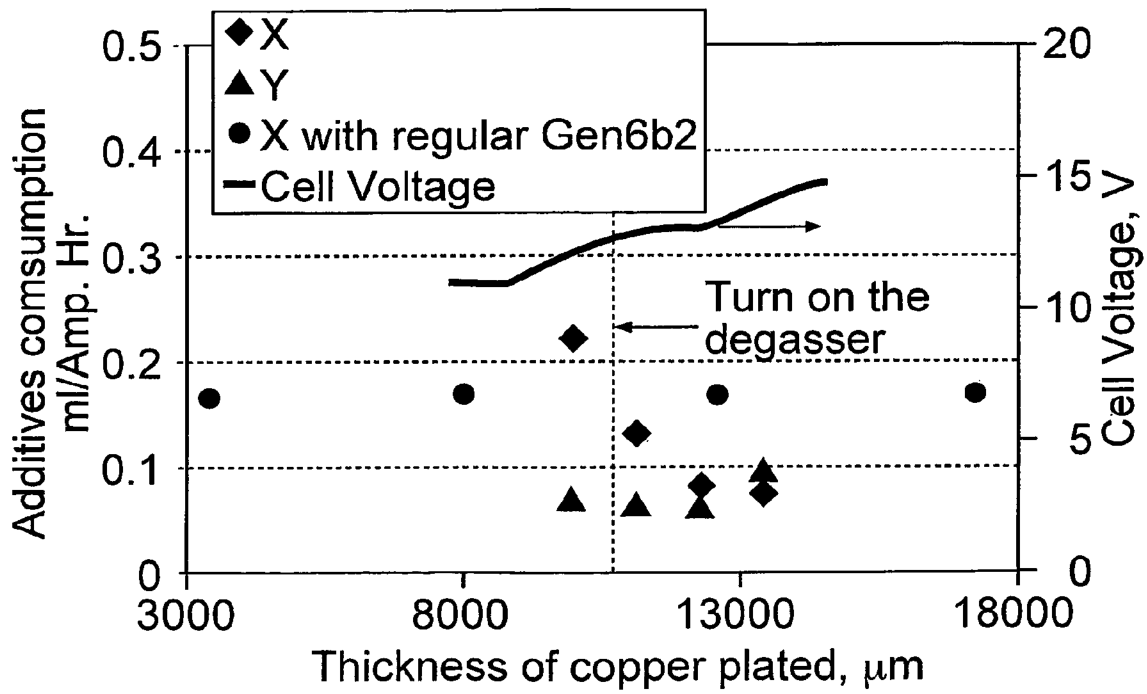
FIG. 7 is a graph showing consumption of additives in the degasser of Example 4.

Additive consumption rate was measured with and without degasser. As shown in FIG. 7, the degasser reduced the consumption rate of additive "X" by nearly 50%; degassing had less effect on the consumption rate of additive "Y". Based on the normal consumption rate of 0.15 ml/Amp. hrs (as circular points shown) for Gen6b3, degasser reduced the consumption rate by 38%.

We claim:

1. A process for reducing consumption of at least one organic additive in a copper plating bath which comprises: passing said copper plating bath from a housing containing said copper plating bath, said housing containing an anode and a cathode comprising a substrate to be plated with copper, to a degasser containing hollow porous fiber membranes having a hydrophobic surface; drawing a vacuum in lumens of said hollow porous fiber membranes to remove oxygen from said copper plating bath and passing degassed copper plating bath to said housing.

2. The process of claim 1 which includes the step of removing particles from said copper plating bath positioned between said housing and said degasser.

3. The process of any one of claim 1 or 2 which includes the step of adding an organic plating additive to said copper plating bath between said housing and said degasser.

4. A system for plating a substrate with copper which comprises:

a housing containing an anode, a cathode comprising said substrate and a copper plating bath containing at least one organic additive;

a degasser unit containing hollow porous fiber membranes having a hydrophobic surface, means for drawing a vacuum in lumens of said hollow porous fiber membranes;

and means for circulating said copper plating bath between said housing and said degasser unit.

5. The system of claim 4 which includes means for removing particles from said copper plating bath, said means positioned between said housing and said degasser unit.

6. The system of anyone of claim 4 or 5 including means for adding said at least one organic additive to said copper plating bath.

7. The system of claim 6 wherein an atmosphere within said housing comprises a gas selected from the group consisting of nitrogen and an inert gas.

8. The system of any one of claim 4 or 5 wherein an atmosphere within said housing comprises a gas selected from the group consisting of nitrogen and an inert gas.

* * * * *